(12) United States Patent  
Syao

(10) Patent No.: US 9,452,567 B2  
(45) Date of Patent: Sep. 27, 2016

(54) STEREOLITHOGRAPHY APPARATUS

(71) Applicant: Kao-Chih Syao, Pleasanton, CA (US)

(72) Inventor: Kao-Chih Syao, Pleasanton, CA (US)

( * ) Notice: Subject to any disclaimer, the term of this patent is extended or adjusted under 35 U.S.C. 154(b) by 106 days.

(21) Appl. No.: 14/454,901

(22) Filed: Aug. 8, 2014

(65) Prior Publication Data

US 2015/0064298 A1  Mar. 5, 2015

Related U.S. Application Data

(60) Provisional application No. 61/870,668, filed on Aug. 27, 2013, provisional application No. 61/979,537, filed on Apr. 15, 2014.

(51) Int. Cl.
  *B29C 67/00* (2006.01)
  *B29K 105/00* (2006.01)
  *B29K 101/10* (2006.01)

(52) U.S. Cl.
  CPC ....... *B29C 67/0062* (2013.01); *B29C 67/0085* (2013.01); *B29K 2101/10* (2013.01); *B29K 2105/0058* (2013.01)

(58) Field of Classification Search
  CPC .......... B29C 67/0062; B29C 67/0085; B29K 2105/0058; B29K 2101/10
  USPC ...................................... 425/174.4
  See application file for complete search history.

(56) References Cited

U.S. PATENT DOCUMENTS

| | | | |
|---|---|---|---|
| 4,929,402 A | 5/1990 | Hull | |
| 5,143,663 A | 9/1992 | Leyden et al. | |
| 5,174,943 A * | 12/1992 | Hull | B29C 35/08 156/242 |
| 5,192,559 A * | 3/1993 | Hull | B29C 67/0062 156/379.6 |
| 5,236,637 A | 8/1993 | Hull | |
| 5,248,456 A | 9/1993 | Evans, Jr. et al. | |
| 5,258,146 A | 11/1993 | Almquist et al. | |
| 5,344,298 A * | 9/1994 | Hull | B29C 35/08 118/423 |
| 5,447,822 A | 9/1995 | Hull et al. | |
| 5,529,473 A | 6/1996 | Lawton et al. | |
| 5,545,367 A | 8/1996 | Bae et al. | |
| 6,027,324 A | 2/2000 | Hull | |
| 6,048,487 A | 4/2000 | Almquist et al. | |
| 6,051,179 A | 4/2000 | Hagenau | |
| 6,537,482 B1 * | 3/2003 | Farnworth | B29C 67/0066 257/E21.503 |
| 7,052,263 B2 | 5/2006 | John | |
| 8,142,179 B2 | 3/2012 | Kihara et al. | |
| 2002/0129485 A1 * | 9/2002 | Mok | G05B 19/4099 29/527.2 |
| 2002/0195748 A1 * | 12/2002 | Farnworth | B29C 67/0066 264/401 |
| 2008/0171284 A1 * | 7/2008 | Hull | B29C 67/0055 430/252 |

(Continued)

*Primary Examiner* — Alison L Hindenlang  
*Assistant Examiner* — Sean S Luk  
(74) *Attorney, Agent, or Firm* — McClure, Qualey & Rodack, LLP

(57) ABSTRACT

A stereolithography apparatus includes a supporting frame assembly, a tank supported on the supporting frame assembly, a vertically moving module, and a build platform. The tank has an anchored portion anchored to the supporting frame assembly. The build platform is vertically moved relative to the tank by the vertically moving module. After a resin layer is solidified and adhered to the bottom of the tank and the build platform, the tank is peeled away from the resin layer starting from a portion of the resin layer adjacent to the anchored portion and partially moves upward relative to the supporting frame assembly around the anchored portion when the build platform leaves the supporting frame assembly. To further reduce the separation force between the cured resin layer and the tank, the bottom of the tank is covered with materials that are transparent, chemically resistant, impact resistant or/and elastic.

20 Claims, 9 Drawing Sheets

(56) References Cited

U.S. PATENT DOCUMENTS

| | | | |
|---|---|---|---|
| 2008/0206383 A1* | 8/2008 | Hull | B29C 67/0096 425/135 |
| 2009/0196946 A1* | 8/2009 | Kihara | B29C 67/0066 425/171 |
| 2009/0309267 A1* | 12/2009 | Boot | B29C 67/0066 264/496 |
| 2011/0089610 A1* | 4/2011 | El-Siblani | B29C 67/0085 264/401 |
| 2012/0195994 A1* | 8/2012 | El-Siblani | B29C 67/007 425/174.4 |
| 2013/0270746 A1* | 10/2013 | Elsey | B29C 35/0888 264/447 |
| 2013/0292862 A1* | 11/2013 | Joyce | B29C 67/0066 264/40.1 |
| 2013/0327917 A1* | 12/2013 | Steiner | F16M 13/022 248/649 |
| 2014/0085620 A1* | 3/2014 | Lobovsky | G03F 7/70775 355/72 |
| 2015/0019000 A1* | 1/2015 | Nakamura | G05D 25/02 700/120 |
| 2015/0231828 A1* | 8/2015 | El-Siblani | B29C 67/0088 264/109 |
| 2015/0231831 A1* | 8/2015 | El-Siblani | B29C 67/0066 264/401 |
| 2015/0298396 A1* | 10/2015 | Chen | B29C 67/0092 425/110 |

\* cited by examiner

STEREOLITHOGRAPHY APPARATUS

RELATED APPLICATIONS

This application claims priority to U.S. provisional application Ser. No. 61/870,668, filed on Aug. 27, 2013 and U.S. provisional application Ser. No. 61/979,537, filed on Apr. 15, 2014, which are herein incorporated by references.

BACKGROUND

1. Technical Field

The present disclosure relates to three-dimensional object printing, and more particularly, the present disclosure is related to stereolithography for producing three-dimensional objects by solidifying photon curable liquid resin.

2. Description of Related Art

Stereolithography technology produces three-dimensional objects by stacking and adhering solid thin layers formed by photon curable liquid resins. Two-dimensional graphic layers are first generated by slicing the three-dimensional computer model of the object to be printed. These two-dimensional patterns are then projected to a liquid resin, usually photosensitive monopolymers, with light that has appropriate wavelength and enough doses to initiate polymerization of the liquid resin. The first layer is attached to a build platform and the rest are adhered to the preceding layer to form a three dimensional solid object.

A conventional stereolithography machine disclosed by Hull (U.S. Pat. No. 4,929,402) solidifies photon curable liquid resins held in a tank by projecting light patterns from the top of the tank. For this top-down configuration, the tank must hold resin enough to fully submerge a completely printed object. The resin surface is leveled after each layer of exposure to ensure uniformity of each layer. Besides, the resin surface does not stay at the same level throughout the printing process, and vertical movement needs to be compensated to maintain the same thickness for each printed layer. Since the curing happens on the resin surface that exposes to air, oxygen inhibition increases the time of resin solidification.

Another conventional method disclosed by John (U.S. Pat. No. 7,052,263), including a bottom-up configuration such that light patterns are projected to a liquid resin through the transparent flat bottom of a resin tank, is thus employed to circumvent the above drawbacks and simplify the machine structure. For this configuration, the resin tank holds enough liquid resin for printing and the volume of the tank is much reduced. A cured resin layer is sandwiched between the bottom of the resin tank and the preceding layer or build platform. Since the cured layer is not formed on top of the liquid resin surface that exposed to air, the layer uniformity and oxygen inhibition problems are absent and there is no need to include a resin surface leveling device in the machine. Each layer is separated from the bottom of the tank and lifted to leave room for the next layer.

However, adhesion always exists between a cured layer and the resin tank as a result of the van der Waals dipole force, chemical bonding force and suction force. The magnitude of the separation force, which is positively correlated with the above forces and the size of solidified area, is one of the most important limiting factors for high resolution printing. To reduce the adhesion, chemically inert films or coatings, such as Teflon or silicone, have been applied to the bottom of resin tanks to prevent cured resin layer from bonding to the tanks. However, even with this improvement, the separation force is still too large to resolve fine prints.

In order to preserve printed fine structure, especially when the cured area is large, or the printed object is mechanically weak, a peeling mechanism is adapted. Peeling a cured layer off a resin tank distributes the adhesion force in a much smaller area gradually rather than the whole cured area at a time. The separation force is thus greatly reduced. Active peeling action has been done by an actuator to tilt a non-flexible resin tank downward. To facilitate peeling, the bottom of the resin tank is normally coated with a layer of elastic silicone. Even though silicone does not form chemical bonds with most of the materials, silicone is not immune to attacks from more reactive resins under extensive UV and heat exposure. Depending on the resin used, silicone can become blurred, deformed, or form strong bonds with the cured resin after a few thousand layers of printing.

SUMMARY

The disclosure provides a stereolithography apparatus that overcomes the aforementioned major problems in existing arts. The stereolithography apparatus includes a supporting frame assembly, a tank, a vertically moving module, and a leveling ball joint, a build platform, and a digital light pattern generator. The tank is supported on the supporting frame assembly. The tank has an anchored portion anchored to the supporting frame assembly. The vertically moving module is fixed on the supporting frame assembly. The leveling ball joint is connected to the vertically moving module. The build platform is connected to the leveling ball joint and located over the tank, so as to be vertically moved relative to the tank by the vertically moving module. The digital light pattern generator is located under the tank. After a resin layer is solidified and adhered to the bottom of the tank and the build platform, the bottom of the tank starts being peeled away from a portion of the resin layer adjacent to the anchored portion. The tank partially moves upward freely relative to the supporting frame assembly around the anchored portion when the build platform moves away from the supporting frame assembly.

In an embodiment of the disclosure, the supporting frame assembly includes a supporting body. The tank includes a transparent bottom plate and a wall structure. The transparent bottom plate is supported on the supporting body. The wall structure is disposed on the transparent bottom plate and configured to form an accommodating space to reserve a resin liquid.

In an embodiment of the disclosure, the anchored portion is an edge of the tank and is pivotally connected to the supporting body, and the vertically moving module includes a cantilever extending over the tank and connected to the leveling ball joint.

In an embodiment of the disclosure, the wall structure has a first side and a second side opposite to each other. The anchored portion is connected to an edge of the transparent bottom plate and extends outside the wall structure from the first side. The supporting frame assembly further includes a first retaining member and a second retaining member. The first retaining member is connected to the supporting body and located over the anchored portion. The second retaining member is connected to the supporting body and located adjacent to the second side. A distance between the first retaining member and the second retaining member is smaller than a distance between a distal end of the anchored portion and the second side, so that the tank is capable of rotating relative to the supporting body substantially around the first retaining member.

In an embodiment of the disclosure, the anchored portion is connected to an edge of the transparent bottom plate and extends outside the wall structure. The supporting frame assembly further includes a pivotal member. The pivotal member is pivotally connected to the supporting body and connected to the anchored portion, so that the tank is capable of rotating relative to the supporting body around a rotation axis of the pivotal member.

In an embodiment of the disclosure, pivotal member includes a rod and a bearing. The rod is fixed to the supporting body. The bearing is pivotally connected to the rod and connected to the anchored portion.

In an embodiment of the disclosure, the wall structure has a first side and a second side opposite to each other. The anchored portion is located on the wall structure and adjacent to the first side. The supporting frame assembly further includes a pivotal member. The pivotal member is disposed on the supporting body and pivotally connected to the anchored portion, so that the tank is capable of rotating relative to the supporting body around a rotation axis of the pivotal member.

In an embodiment of the disclosure, the pivotal member includes a bearing and a rod. The bearing is fixed to the supporting body. The rod is pivotally connected to the bearing and connected to the anchored portion.

In an embodiment of the disclosure, the anchored portion is connected to an edge of the transparent bottom plate and extends outside the wall structure. The supporting frame assembly further includes a hinge. The hinge includes two folding panels. The folding panels are pivotally connected to each other and respectively connected to the supporting body and the anchored portion, so that the tank is capable of rotating relative to the supporting body around a rotation axis of the hinge.

In an embodiment of the disclosure, the anchored portion is located adjacent to a side of the wall structure portion. The supporting frame assembly further includes a ball joint connected between the supporting body and the anchored portion, so that the tank is capable of rotating relative to the supporting body around the ball joint.

In an embodiment of the disclosure, the supporting frame assembly further includes two retaining members. The retaining members are connected to the supporting body and located adjacent to two opposite sides of the wall structure for retaining horizontal rotations of the tank relative to the supporting body.

In an embodiment of the disclosure, the transparent bottom plate is made from a flexible transparent material, and the anchored portion is located on the transparent bottom plate.

In an embodiment of the disclosure, the anchored portion is connected to an edge of the transparent bottom plate and extends outside the wall structure. The supporting frame assembly further includes a clamping member fixed to the supporting body. The anchored portion is clamped between the supporting body and the clamping member.

In an embodiment of the disclosure, the clamping member includes a clamping body and a hook. An end of the clamping body is connected to the supporting body. The hook is connected to another end of the clamping body and detachably hooked with an edge of the supporting body.

In an embodiment of the disclosure, the tank is further made from a flexible material with elasticity, and the supporting body is a transparent supporting plate.

In an embodiment of the disclosure, the stereolithography apparatus further includes a dynamometer disposed on the supporting body and connected to the transparent bottom plate.

In an embodiment of the disclosure, the tank further includes a transparent elastic layer and a transparent low surface energy protective film. The transparent elastic layer is disposed on the transparent bottom plate in the accommodating space. The transparent low surface energy protective film is disposed on the transparent elastic layer.

In an embodiment of the disclosure, the tank further includes a transparent film with high resistance to impact and tearing, and the transparent film is disposed between the transparent elastic layer and the transparent low surface energy protective film.

In an embodiment of the disclosure, the material of the transparent elastic layer comprises silicone, polyurethane, or acrylic gel, and the material of the transparent low surface energy protective film comprises fluropolymer, polyethylene, or polypropylene.

In an embodiment of the disclosure, the tank further includes a transparent material with low surface energy that is chemically resistant, impact resistant and also elastic, and the material is disposed on the transparent bottom plate in the accommodating space or is made into an accommodating tank.

Accordingly, the stereolithography apparatus of the disclosure provides a passive self-peeling mechanism achieved by anchoring the anchored portion of the tank to the supporting frame assembly while allowing the tank to partially move upward freely relative to the supporting frame assembly around the anchored portion and thus eliminating the need of an extra actuator for tilting the tank downwards. Equipped with the above passive mechanism, the printer structure is simplified with only one vertical actuator to lift and lower the build platform. Moreover, the stereolithography apparatus of the disclosure further provides the transparent low surface energy protective film bonded on top of the impact resistant film which is bonded on top of the transparent elastic layer to protect the transparent elastic layer. As a result, the stereolithography apparatus of the disclosure is able to improve the print quality and speed, simplify the printer structure, enhance the printer reliability, and lower the printer cost.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
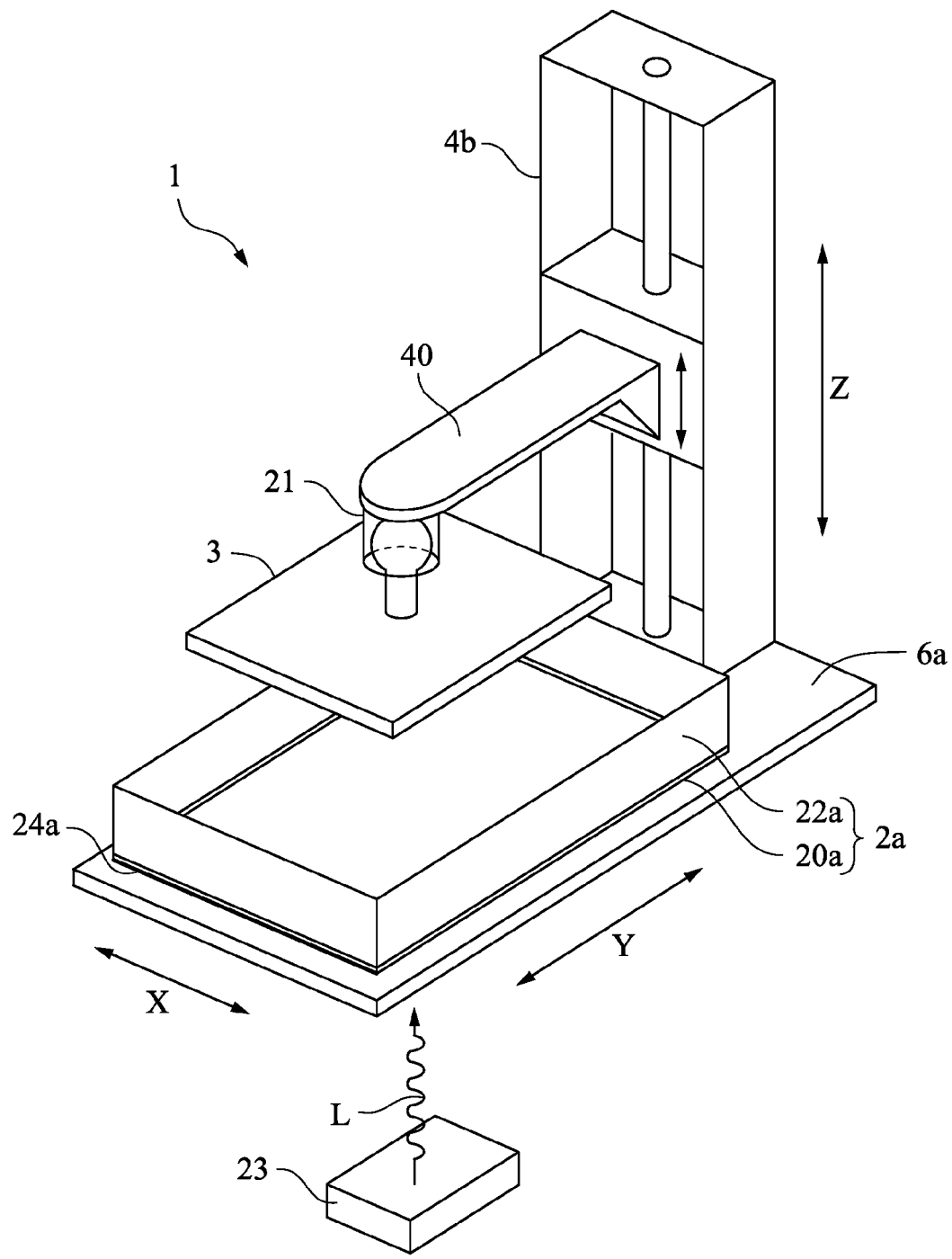
FIG. 1 is an axonometric view of a stereolithography apparatus according to an embodiment of the disclosure.

FIG. 1 is an axonometric view of a stereolithography apparatus 1 according to an embodiment of the disclosure. In the embodiment of the disclosure, the stereolithography apparatus 1 includes a supporting frame assembly, a tank 2a, a leveling ball joint 21, a build platform 3, a vertically moving module 4b, and a digital light pattern generator 23. The supporting frame assembly includes a supporting body 6a. The tank 2a is supported on the supporting body 6a. The tank 2a has an anchored portion 24a anchored to the supporting body 6a. The vertically moving module 4b is fixed on the supporting body 6a and connected to the build platform 3 through the leveling ball joint 21. The digital light pattern generator 23 is located under the tank 2a. In detail, the vertically moving module 4b includes a cantilever 40 extending over the tank 2a, and the leveling ball joint 21 is connected between the cantilever 40 and the build platform 3. The leveling ball joint 21 is able to provide a fast leveling mechanism to the build platform 3.

The tank 2a includes a transparent bottom plate 20a and a wall structure 22a. The transparent bottom plate 20a is supported on the supporting body 6a. The wall structure 22a is disposed on the transparent bottom plate 20a and configured to form an accommodating space to reserve a liquid resin 10 (shown in FIG. 2A and FIG. 2B). The transparent bottom plate 20a is able to ensure the uniformity of cured layers when sitting on the supporting body 6a. In detail, the anchored portion 24a is an edge of the transparent bottom plate 20a, and the anchored portion 24a is pivotally connected to the supporting body 6a.

Figure 2A:
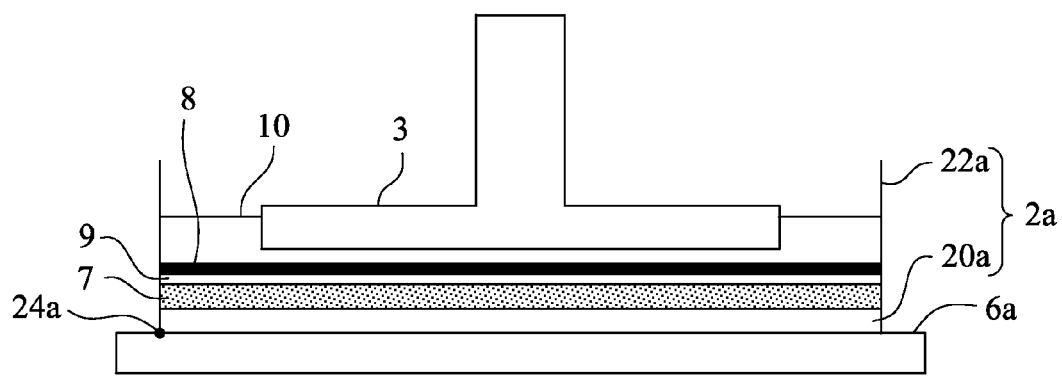
FIG. 2A is a side view of a self-peeling mechanism that illustrates the position of a build platform relative to a tank before a printing cycle according to an embodiment of the disclosure.
Figure 2B:
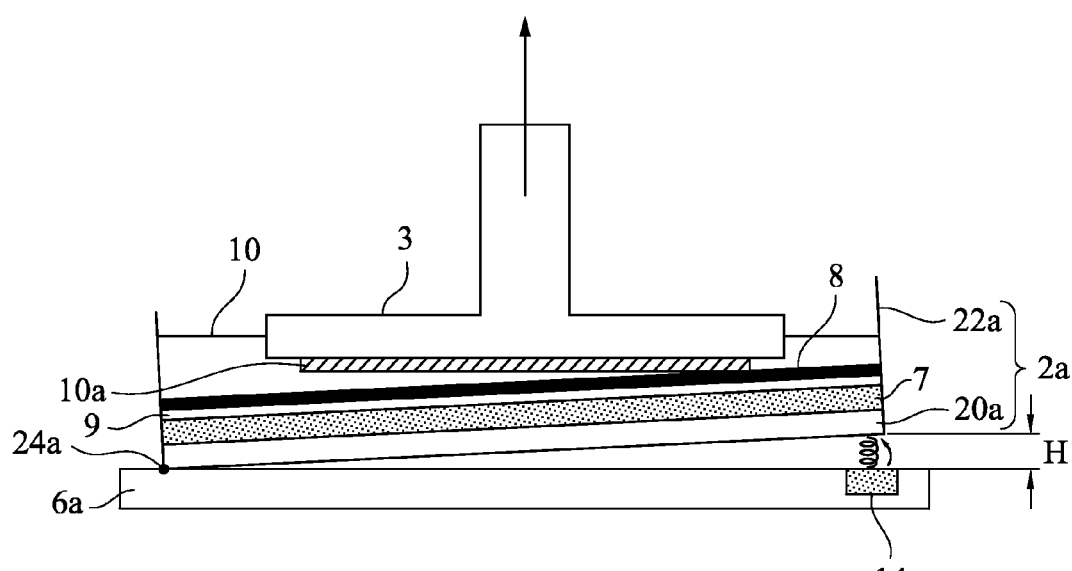
FIG. 2B is a side view of the self-peeling mechanism that illustrates the position of the build platform relative to the tank right before full separation.

FIG. 2A is a side view of a self-peeling mechanism that illustrates the position of the build platform 3 relative to the tank 2a before a printing cycle according to an embodiment of the disclosure. FIG. 2B is a side view of the self-peeling mechanism that illustrates the position of the build platform 3 relative to the tank 2a right before full separation. In the embodiment before printing, the tank 2a is filled with the liquid resin 10 that has a volume more than the volume of the printed object for producing a three-dimensional solid object. One layer printing cycle starts from lowering the build platform 3 to one layer thickness above the transparent bottom plate 20a by the vertically moving module 4b. The digital light pattern generator 23 is located under the supporting body 6a for generating a curing light L to the accommodating space of the tank 2a through the supporting body 6a and the transparent bottom plate 20a. In practical applications, the supporting body 6a has a window (not shown) or is transparent, so as to be passed through by the curing light L. After a resin layer 10a in FIG. 2B is solidified by the curing light L and adhered to the transparent bottom plate 20a and the build platform 3, the build platform 3 is lifted by the vertically moving module 4b. The peeling or separation starts from a portion of the resin layer 10a adjacent to the anchored portion 24a during lifting the build platform 3. Since the tank 2a can move upward freely around the anchored portion 24a, adhesion force between the tank 2a and the resin layer 10a lifts the unanchored portion of the tank 2a. In effect, the anchor portion 24a peels the tank 2a away from the cured resin layer 10a gradually until the tank 2a is detached from the cured layer 10a. That is, the tank 2a partially moves upward freely relative to the supporting body 6a around the anchored portion 24a. Next, the tank 2a drops back to the supporting body 6a after full separation and waits for the next layer printing cycle.

When the cured resin layer 10a has a greater area, the separation force also increases and the tank 2a is lifted higher before dropping back to the supporting body 6a. The lifted height H can be calibrated to measure the separation force for the cured resin layer 10a. The measured force can be used to predict the separation force for the next layer to be printed. The prediction is then fed back to a computer algorithm for adaptive lifting height and speed, such that a shorter printing time can be achieved. As shown in FIG. 2B, a sensor 14 (e.g., a dynamometer) installed on the supporting body 6a underneath the transparent bottom plate 20a can monitor separation force in real time and feed the measurement back to a computer algorithm for adaptive lifting height and speed. Equipped with the adaptive lifting mechanism, printing process is faster and more reliable.

Figure 2C:
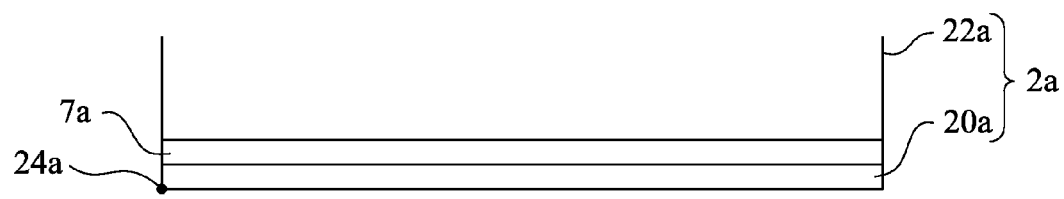
FIG. 2C is a side view of the tank in FIG. 2A according to another embodiment of the disclosure.

As shown in FIGS. 2A, 2B, and 2C, the separation force can be further reduced by covering the transparent bottom plate 20a with materials that are transparent, chemically resistant, impact resistant and/or elastic. In FIG. 2A, a thin transparent low surface energy protective film 8 is bonded on top of an impact resistant film 9 which is bonded on top of a transparent elastic layer 7 in the accommodating space of the tank 2a. The transparent low surface energy protective film 8 is chemically resistant and does not stick to other materials easily.

The chemically resistant transparent low surface energy protective film 8, including but not limited to fluropolymers, polyethylene or polypropylene, can be bonded to the impact resistant film 9 or silicone with optically transparent transferring tape or liquid optically clear adhesive. The thickness of the transparent low surface energy protective film 8 ranging from 25 to 125 micrometers is preferred to preserve the elasticity of the underlying silicone. When the transparent elastic layer 7 is protected, the transparent elastic layer 7 is not restricted to just silicone, other clear elastic materials, including but not limited to polyurethane or acrylic gel, can also provide similar elasticity without limitations imposed by chemical resistance and toughness.

The transparent low surface energy protective film 8 may be stretched and deformed when experiencing higher separation force. To extend the life time of the transparent low surface energy protective film 8, the hardness of the underlying transparent elastic layer 7 can be increased up to Shore A 90 by trading off some benefits from elasticity. An alternative way to extend the life time of the transparent low surface energy protective film 8 is to bond a transparent film 9 (as shown in FIGS. 2A and 2B) with high resistance to impact and tearing between the transparent low surface energy protective film 8 and the underlying transparent elastic layer 7 using optically transparent transferring tape or liquid optically clear adhesive.

FIG. 2C is a side view of the tank 2a in FIG. 2A according to another embodiment of the disclosure. Alternatively, as shown in FIG. 2C, an advanced transparent material 7a with low surface energy that is chemically resistant, elastic and impact resistant, such as clear fluroelastomer, can be disposed on the transparent bottom plate 20a in the accommodating space to achieve the same function provided by combining the transparent elastic layer 7, the transparent low surface energy protective film 8, and the transparent film 9 with high resistance to impact and tearing.

Figure 3A:
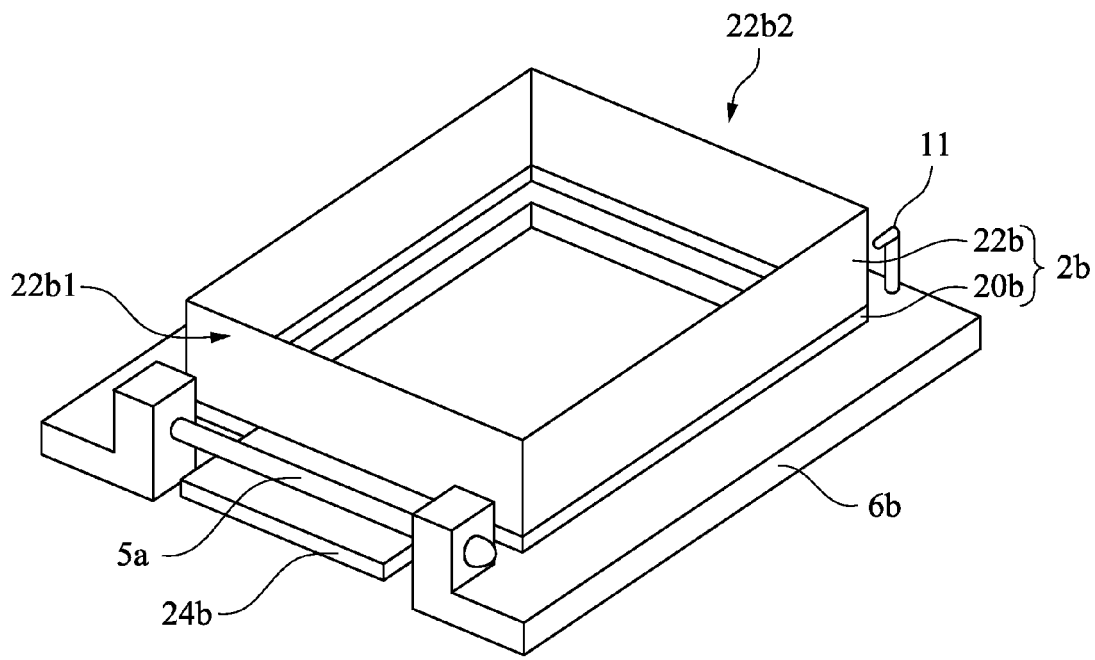
FIG. 3A is an axonometric view of a supporting frame assembly and the tank according to an embodiment of the disclosure.
Figure 3B:
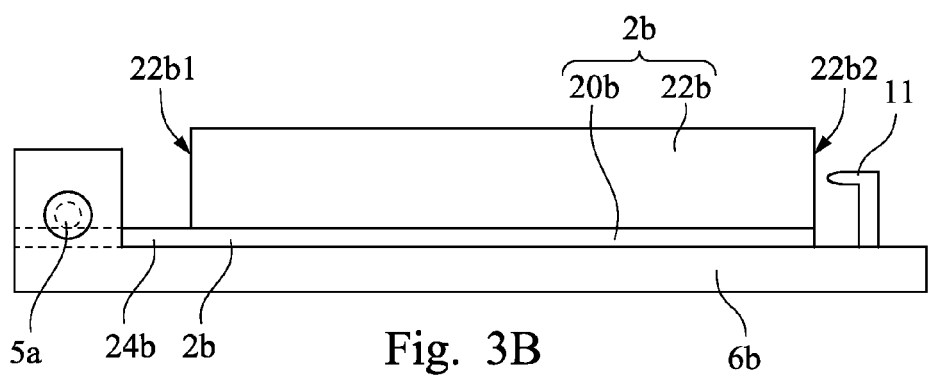
FIG. 3B is a side view of FIG. 3A before exposure.
Figure 3C:
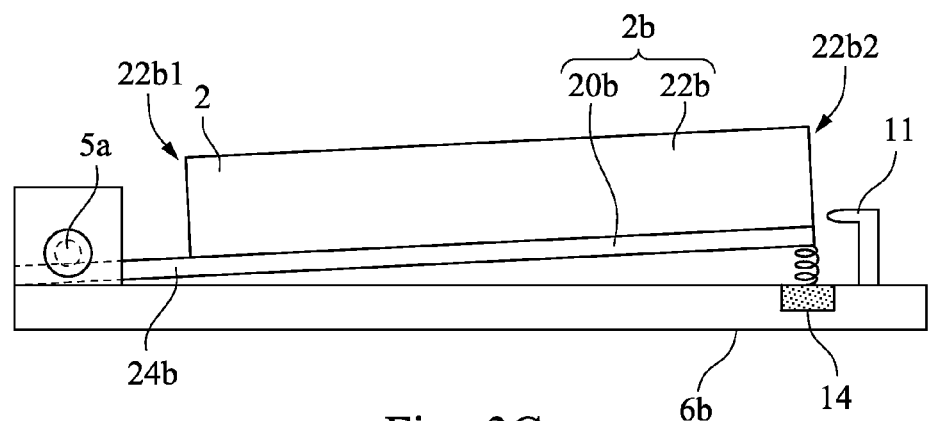
FIG. 3C is another side view of FIG. 3A before full separation.

FIG. 3A is an axonometric view of a supporting frame assembly and a tank 2b according to an embodiment of the disclosure. FIG. 3B is a side view of FIG. 3A before exposure. FIG. 3C is another side view of FIG. 3A before full separation. In the embodiment of the disclosure, the tank 2b includes a transparent bottom plate 20b and a wall structure 22b. The wall structure 22b has a first side 22b1 and a second side 22b2 opposite to each other. An anchored portion 24b is connected to an edge of the transparent bottom plate 20b and extends outside the wall structure 22b from the first side 22b1. The supporting frame assembly includes a supporting body 6b, a first retaining member 5a, and a second retaining member 11. The first retaining member 5a is connected to the supporting body 6a and precisely located over the anchored portion 24b for blocking upward motions of the anchored portion 24b. The second retaining member 11 is connected to the supporting body 6b and located adjacent to the second side 22b2. As shown in FIGS. 3B and 3C, a distance between the first retaining member 5a and the second retaining member 11 is smaller than a distance between a distal end of the anchored portion 24b and the second side 22b2, so that the tank 2b is capable of rotating relative to the supporting body 6b substantially around the first retaining member 5a, and the second retaining member 11 is able to prevent the tank 2b from leaving the first retaining member 5a. The first retaining member 5a is a rod, but the disclosure is not limited in this regard. In practical applications, the second retaining member 11 can also be used as a quick release. Lowering the second retaining member 11, the tank 2b can be quickly removed from the supporting frame assembly by pulling the tank 2b away from the first retaining member 5a.

Figure 4A:
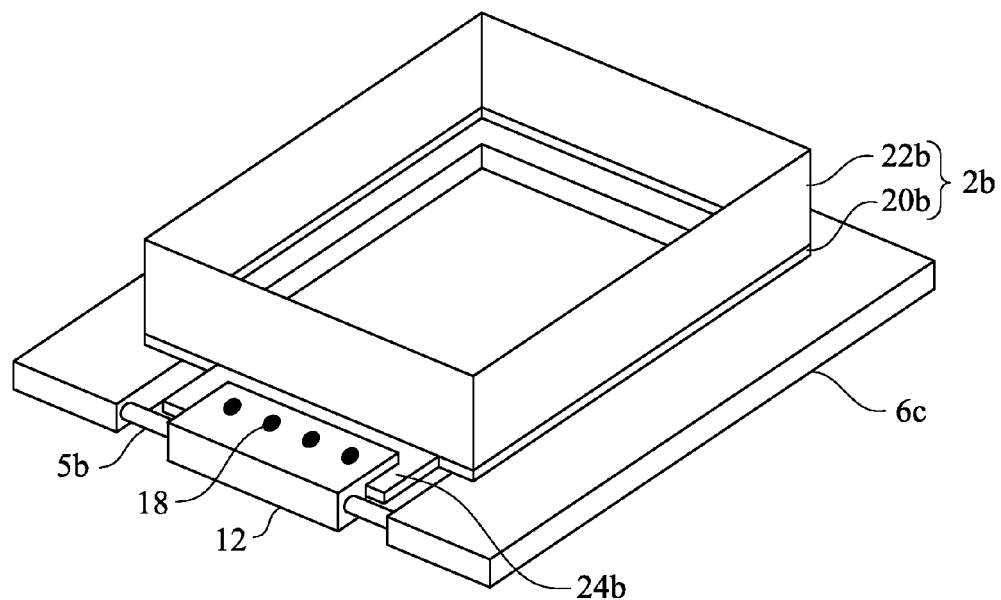
FIG. 4A is an axonometric view of a supporting frame assembly and the tank according to another embodiment of the disclosure.
Figure 4B:
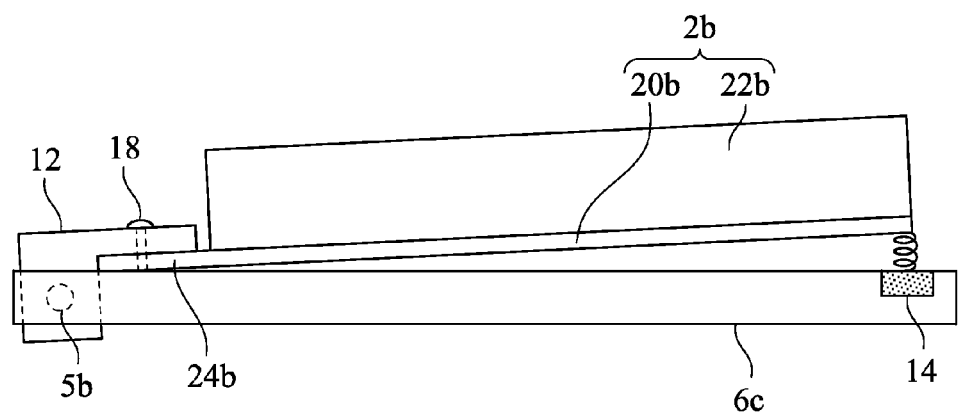
FIG. 4B is a side view of FIG. 4A before full separation.

FIG. 4A is an axonometric view of a supporting frame assembly and the tank 2b according to another embodiment of the disclosure. FIG. 4B is a side view of FIG. 4A before full separation. In the embodiment of the disclosure, the anchored portion 24b is connected to an edge of the transparent bottom plate 20b and extends outside the wall structure 22b. The supporting frame assembly includes a supporting body 6c and a pivotal member including a rod 5b and a bearing 12. The rod 5b is fixed to the supporting body 6c, and the bearing 12 is pivotally connected to the rod 5b and connected to the anchored portion 24b, so that the tank 2b is capable of rotating relative to the supporting body 6c around a rotation axis of the rod 5b. The anchored portion 24b is fastened to the bearing 12 with screws 18, but the disclosure is not limited in this regard.

Figure 5A:
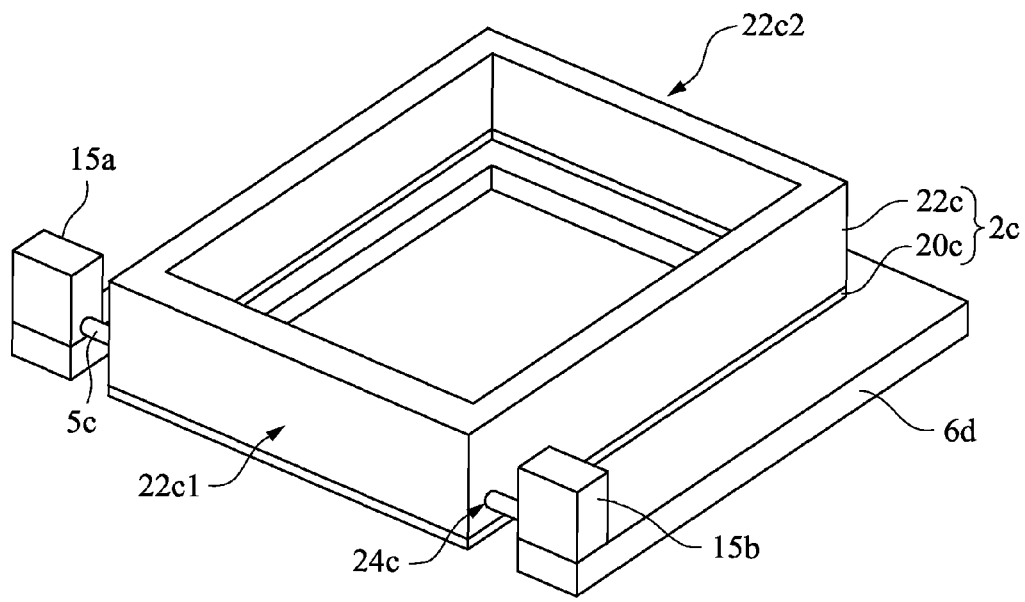
FIG. 5A is an axonometric view of a supporting frame assembly and the tank according to another embodiment of the disclosure.
Figure 5B:
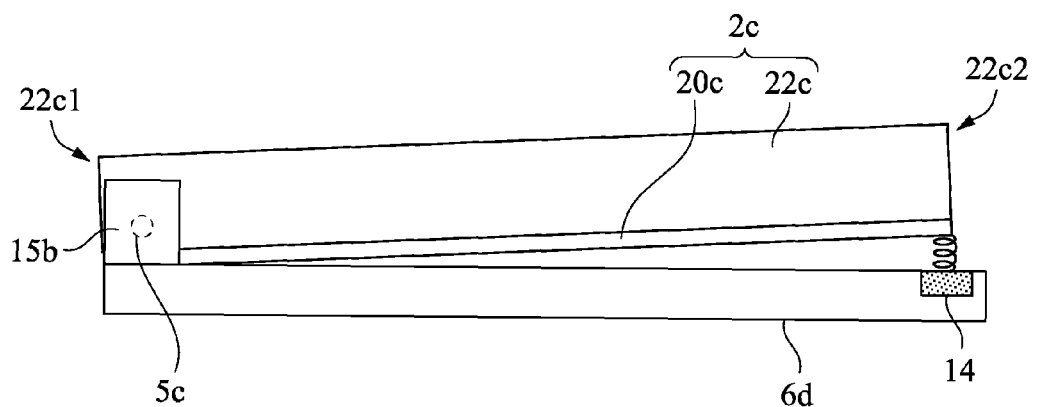
FIG. 5B is a side view of FIG. 5A before full separation.

FIG. 5A is an axonometric view of a supporting frame assembly and a tank 2c according to another embodiment of the disclosure. FIG. 5B is a side view of FIG. 5A before full separation. In the embodiment of the disclosure, the tank 2c includes a transparent bottom plate 20c and a wall structure 22c. The wall structure 22c has a first side 22c1 and a second side 22c2 opposite to each other. An anchored portion 24c is located on the wall structure 22c and adjacent to the first side 22c1. In detail, the anchored portion 24c is a through hole on the wall structure 22c parallel to the first side 22c1. The supporting frame assembly includes a supporting body 6d and a pivotal member including two bearings 15a and 15b and a rod 5c. The bearings 15a and 15b are fixed to the supporting body 6d, and the rod 5c is pivotally connected to the bearings 15a and 15b and connected to the anchored portion 24c, so that the tank 2c is capable of rotating relative to the supporting body 6d around a rotation axis of the rod 5c. In practical applications, the bearings 15a and 15b can slide outwards to allow quick release of the tank 2c.

Figure 6:
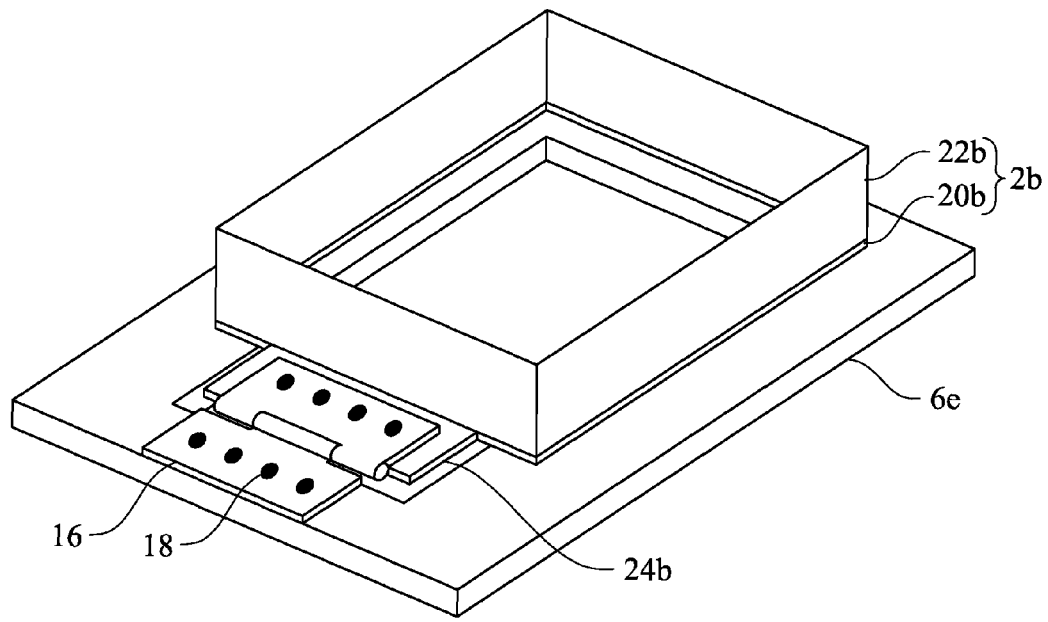
FIG. 6 is an axonometric view of a supporting frame assembly and the tank according to another embodiment of the disclosure.

FIG. 6 is an axonometric view of a supporting frame assembly and the tank 2b according to another embodiment of the disclosure. In the embodiment of the disclosure, the anchored portion 24b is connected to an edge of the transparent bottom plate 20b and extends outside the wall structure 22b. The supporting frame assembly includes a supporting body 6e and a hinge 16. The hinge 16 includes two folding panels pivotally connected to each other and respectively connected to the supporting body 6e and the anchored portion 24b, so that the tank 2b is capable of rotating relative to the supporting body 6e around a rotation axis of the hinge 16. In the embodiment, the hinge 16 is fastened to the supporting body 6e and the anchored portion 24b with screws 18, but the disclosure is not limited in this regard.

Figure 7:
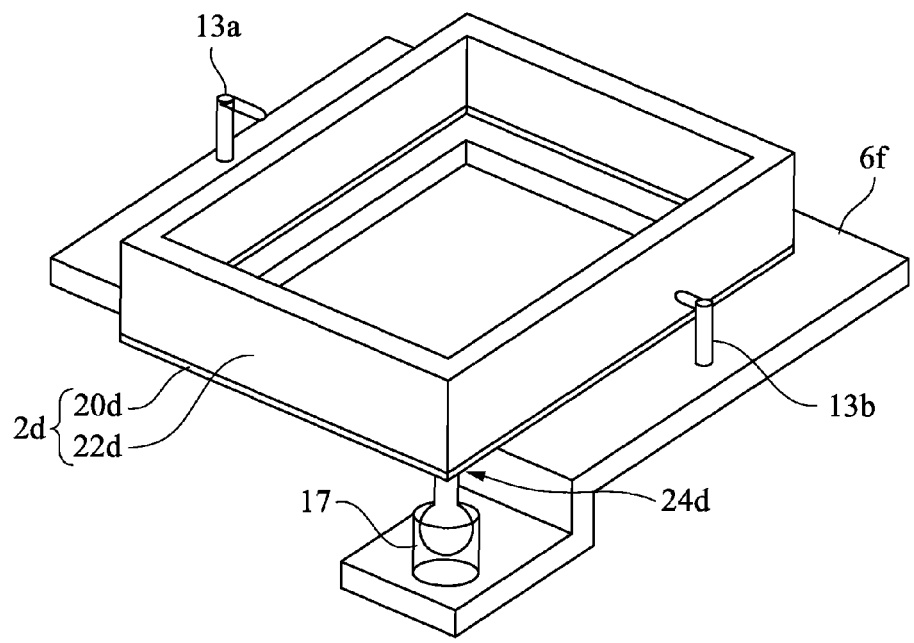
FIG. 7 is an axonometric view of a supporting frame assembly and the tank according to another embodiment of the disclosure.

FIG. 7 is an axonometric view of a supporting frame assembly and a tank 2d according to another embodiment of the disclosure. In the embodiment of the disclosure, the tank 2d includes a transparent bottom plate 20d and a wall structure 22d. An anchored portion 24d is located on the transparent bottom plate 20d adjacent to a side of the wall structure portion 22d. In detail, the anchored portion 24d is located at a corner of the transparent bottom plate 20d. The supporting frame assembly includes a supporting body 6f and a ball joint 17 connected between the supporting body 6f and the anchored portion 24d, so that the tank 2d is capable of rotating relative to the supporting body 6f around the ball joint 17. In some embodiments, the corner of the tank 2d is strong enough to hold the separation force without damaging the tank 2d.

To ensure the tank 2d is properly aligned under the build platform 3 after the resin layer 10a is separated, the supporting frame assembly further includes two retaining members 13a and 13b connected to the supporting body 6f and located adjacent to two opposite sides of the wall structure 22d for retaining horizontal rotations of the tank 2d relative to the supporting body 6f. The peeling starts from the anchored portion 24d and extends along the diagonal of tank 2d. The average separation force for pivoting one corner of tank 2d is smaller than that of pivoting one edge of tank 2d. Alternatively, in another embodiment, the ball joint 17 can be fixed on top of the wall structure 22d of one corner to achieve the same effect.

Figure 8A:
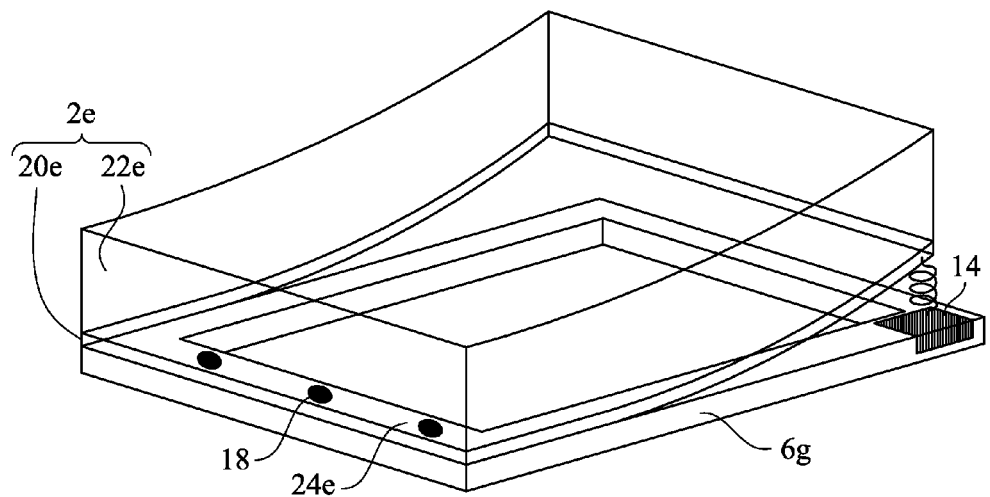
FIG. 8A is an axonometric view of a supporting frame assembly and a tank according to another embodiment of the disclosure.

FIG. 8A is an axonometric view of a supporting frame assembly and a tank 2e according to another embodiment of the disclosure. In the embodiment of the disclosure, the tank 2e includes a transparent bottom plate 20e made from a flexible transparent material and a wall structure 22e, and an anchored portion 24e is located on the transparent bottom plate 20e. The supporting frame assembly includes a supporting body 6g. The anchored portion 24e is fastened to the supporting body 6g with screws 18 without rotations. To maintain the flatness and uniformity of the cured resin layer 10a, the transparent bottom plate 20e does not sag with the weight of liquid resin 10 when the tank 2e lies flat on the supporting body 6g. The transparent bottom plate 20e can be made from transparent flexible glass, plastics, or elastomers. The peeling action is achieved by bending the flexible tank 2e upward with or without the assistance of an elastic peeling material, such as silicone, covering the transparent bottom plate 20e. However, a low surface energy material such as Teflon is used to prevent chemical bonding to the transparent bottom plate 20e after curing. The gravity pulls the tank 2e back to supporting body 6g and prevents fatigue of the transparent bottom plate 20e. If the flexible transparent material has elasticity or is not strong enough to avoid bending by the gravity, the transparent bottom plate 20e must be supported with a flat transparent plate to avoid sagging.

Figure 8B:
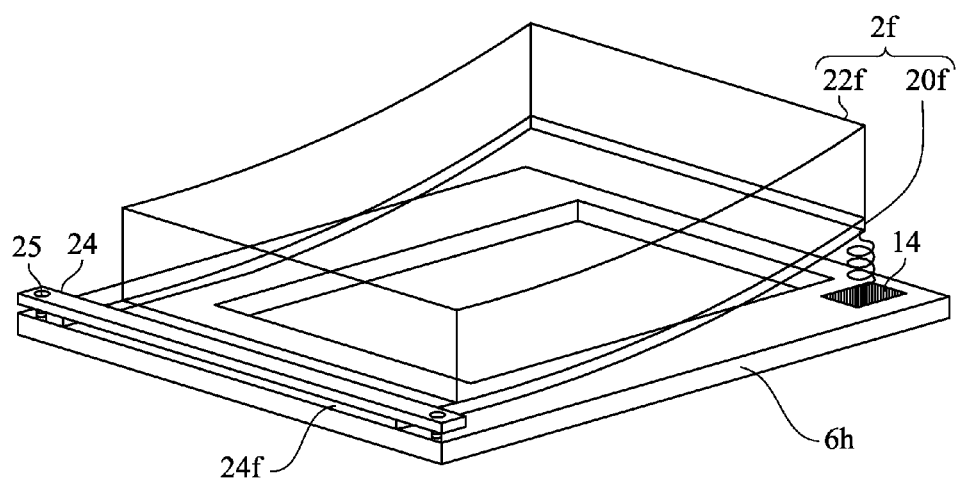
FIG. 8B is an axonometric view of a supporting frame assembly and the tank according to another embodiment of the disclosure.

FIG. 8B is an axonometric view of a supporting frame assembly and a tank 2f according to another embodiment of the disclosure. In the embodiment of the disclosure, the tank 2f includes a transparent bottom plate 20f and a wall structure 22f. An anchored portion 24f is connected to an edge of the transparent bottom plate 20f and extends outside the wall structure 22f. The supporting frame assembly includes a supporting body 6h and a clamping member 24 fixed to the supporting body 6h. The anchored portion 24f is clamped between the supporting body 6h and the clamping member 24. In the embodiment, the clamping member 24 is a quick release bar fastened to the supporting body 6h with release screws 25, but the disclosure is not limited in this regard.

Figure 8C:
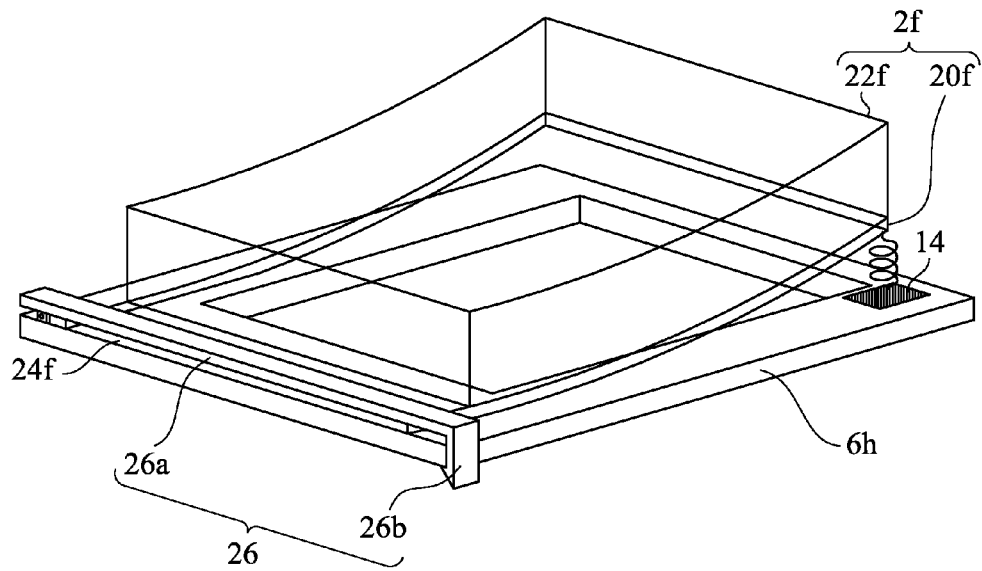
FIG. 8C is an axonometric view of a supporting frame assembly and the tank according to another embodiment of the disclosure.

FIG. 8C is an axonometric view of a supporting frame assembly and the tank 2f according to another embodiment of the disclosure. In the embodiment of the disclosure, the supporting frame assembly further includes the supporting body 6h and a clamping member 26 fixed to the supporting body 6h. The anchored portion 24f is clamped between the supporting body 6h and the clamping member 26. In detail, the clamping member 26 includes a clamping body 26a and a hook 26b, an end of the clamping body 26a is connected to the supporting body 6h, and the hook 26b is connected to another end of the clamping body 26a and detachably hooked with an edge of the supporting body 6h. As a result, the clamping member 26 serves as a quick release clip.

Figure 8D:
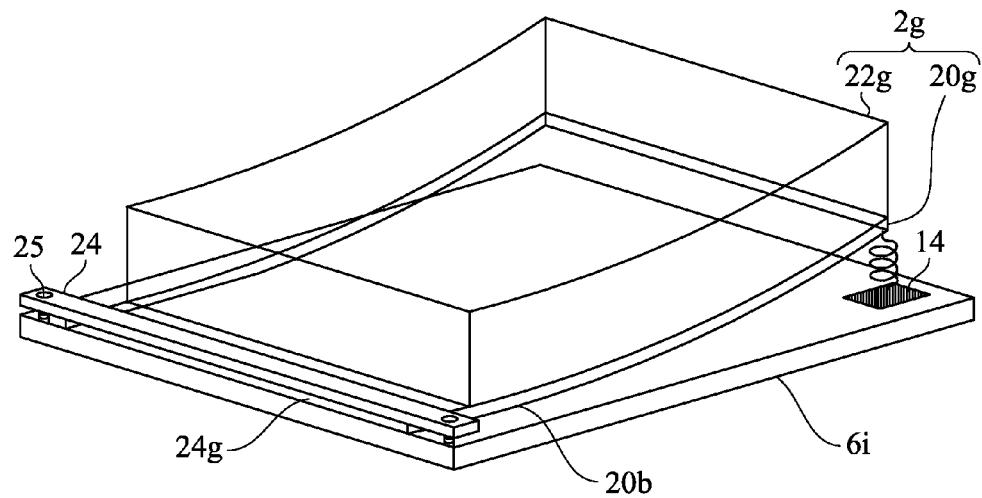
FIG. 8D is an axonometric view of a supporting frame assembly and a tank according to another embodiment of the disclosure.

FIG. 8D is an axonometric view of a supporting frame assembly and a tank 2g according to another embodiment of the disclosure. In the embodiment of the disclosure, the tank 2g includes a transparent bottom plate 20g and a wall structure 22g. An anchored portion 24g is connected to an edge of the transparent bottom plate 20g. The supporting frame assembly includes a supporting body 6i and the clamping member 24 fixed to the supporting body 6i. The anchored portion 24g is clamped between the supporting body 6i and the clamping member 24. In the embodiment, the clamping member 24 is a quick release bar fastened to the supporting body 6i with release screws 25, but the disclosure is not limited in this regard. It should be pointed out that the tank 2g of the embodiment is further made from a flexible material with elasticity, and the supporting body 6i is a transparent supporting plate for preventing the transparent bottom plate 20g with elasticity from sagging.

Figure 8E:
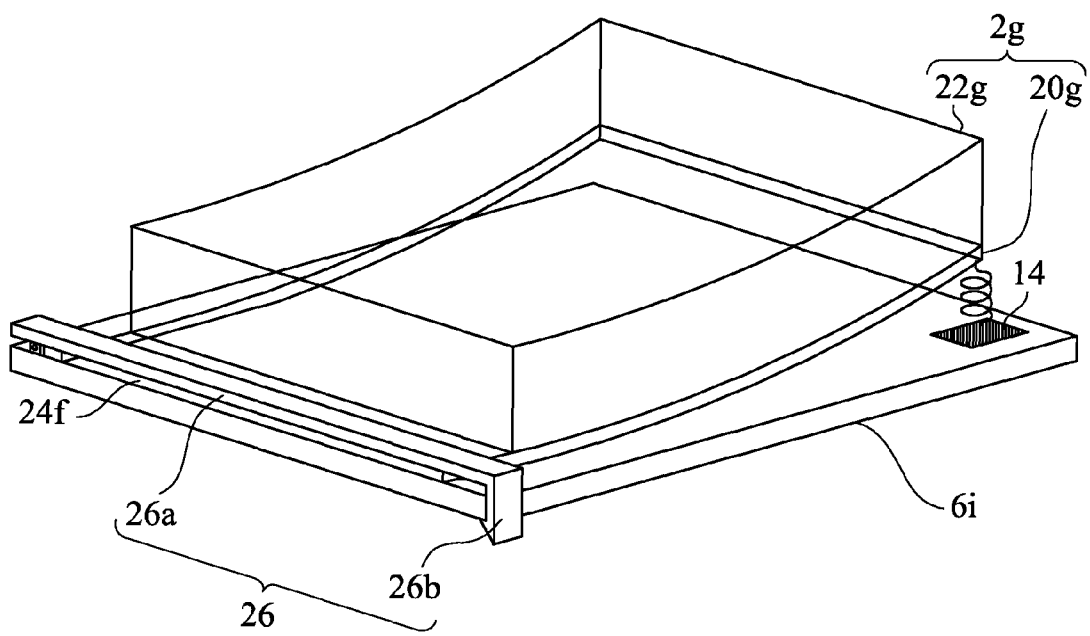
FIG. 8E is an axonometric view of a supporting frame assembly and the tank according to another embodiment of the disclosure.

FIG. 8E is an axonometric view of a supporting frame assembly and the tank 2g according to another embodiment of the disclosure. In the embodiment of the disclosure, the supporting frame assembly further includes the supporting body 6i and the clamping member 26 fixed to the supporting body 6i. The anchored portion 24g is clamped between the supporting body 6i and the clamping member 26. In detail, the clamping member 26 includes a clamping body 26a and a hook 26b, an end of the clamping body 26a is connected to the supporting body 6i, and the hook 26b is connected to another end of the clamping body 26a and detachably hooked with an edge of the supporting body 6i. As a result, the clamping member 26 serves as a quick release clip. It should be pointed out that the tank 2g of the embodiment is further made from a flexible material with elasticity, and the supporting body 6i is a transparent supporting plate for preventing the transparent bottom plate 20g with elasticity from sagging.

According to the foregoing recitations of the embodiments of the disclosure, it can be seen that the stereolithography apparatus of the disclosure provides a passive self-peeling mechanism achieved by anchoring the anchored portion of the tank to the supporting frame assembly while allowing the tank to partially move upward freely relative to the supporting frame assembly around the anchored portion and thus eliminating the need of an extra actuator for tilting the tank downwards. Equipped with the above passive mechanism, the printer structure is simplified with only one vertical actuator to lift and lower the build platform. Moreover, the stereolithography apparatus of the disclosure further provides the transparent low surface energy protective film bonded on top of the impact resistant film which is bonded on top of the transparent elastic layer to protect the transparent elastic layer. As a result, the stereolithography apparatus of the disclosure is able to improve the print quality and speed, simplify the printer structure, enhance the printer reliability, and lower the printer cost.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A stereolithography apparatus, comprising:
  a supporting frame assembly;
  a tank supported on the supporting frame assembly, wherein the tank has an anchored portion anchored to the supporting frame assembly;
  a vertically moving module fixed on the supporting frame assembly;
  a build platform connected to the vertically moving module and located over the tank, so as to vertically moved relative to the tank by the vertically moving module; and
  a digital light pattern generator located under the tank, wherein after a resin layer is solidified and adhered to the bottom of the tank and the build platform, the bottom of the tank is peeled from the resin layer from a portion of the resin layer adjacent to the anchored portion and partially moves upward freely relative to the supporting frame assembly around the anchored portion when the build platform moves away from the supporting frame assembly.

2. The stereolithography apparatus of claim 1, wherein the supporting frame assembly comprises a supporting body, and the tank comprises:
   a transparent bottom supported on the supporting body; and
   a wall structure disposed on the transparent bottom and configured to form an accommodating space to reserve a resin liquid.

3. The stereolithography apparatus of claim 2, further comprising a leveling ball joint connected to the vertically moving module and the build platform, wherein the anchored portion is an edge of the tank and is pivotally connected to the supporting body, and the vertically moving module includes a cantilever extending over the tank and connected to the leveling ball joint.

4. The stereolithography apparatus of claim 2, wherein the wall structure has a first side and a second side opposite to each other, the anchored portion is connected to an edge of the transparent bottom plate and extends outside the wall structure from the first side, and the supporting frame assembly further comprises:
   a first retaining member connected to the supporting body and located over the anchored portion; and
   a second retaining member connected to the supporting body and located adjacent to the second side, wherein a distance between the first retaining member and the second retaining member is smaller than a distance between a distal end of the anchored portion and the second side, so that the tank is capable of rotating relative to the supporting body substantially around the first retaining member.

5. The stereolithography apparatus of claim 2, wherein the anchored portion is connected to an edge of the transparent bottom plate and extends outside the wall structure, and the supporting frame assembly further comprises:
   a pivotal member pivotally connected to the supporting body and the anchored portion, so that the tank is capable of rotating relative to the supporting body around a rotation axis of the pivotal member.

6. The stereolithography apparatus of claim 5, wherein the pivotal member comprises:
   a rod fixed to the supporting body; and
   a bearing pivotally connected to the rod and the anchored portion.

7. The stereolithography apparatus of claim 2, wherein the wall structure has a first side and a second side opposite to each other, the anchored portion is located on the wall structure and adjacent to the first side, and the supporting frame assembly further comprises:
   a pivotal member disposed on the supporting body and pivotally connected to the anchored portion, so that the tank is capable of rotating relative to the supporting body around a rotation axis of the pivotal member.

8. The stereolithography apparatus of claim 7, wherein the pivotal member comprises:
   a bearing fixed to the supporting body; and
   a rod pivotally connected to the bearing and the anchored portion.

9. The stereolithography apparatus of claim 2, wherein the anchored portion is connected to an edge of the transparent bottom plate and extends outside the wall structure, and the supporting frame assembly further comprises:
   a hinge comprising two folding panels pivotally connected to each other and respectively connected to the supporting body and the anchored portion, so that the tank is capable of rotating relative to the supporting body around a rotation axis of the hinge.

10. The stereolithography apparatus of claim 2, wherein the anchored portion is located adjacent to a side of the wall structure portion, and the supporting frame assembly further comprises:
    a ball joint connected between the supporting body and the anchored portion, so that the tank is capable of rotating relative to the supporting body around the ball joint.

11. The stereolithography apparatus of claim 10, wherein the supporting frame assembly further comprises two retaining members connected to the supporting body and located adjacent to two opposite sides of the wall structure for retaining horizontal rotations of the tank relative to the supporting body.

12. The stereolithography apparatus of claim 2, wherein the transparent bottom plate is made from a flexible transparent material, and the anchored portion is located on the transparent bottom plate.

13. The stereolithography apparatus of claim 12, wherein the anchored portion is connected to an edge of the transparent bottom plate and extends outside the wall structure, and the supporting frame assembly further comprises:
    a clamping member fixed to the supporting body, wherein the anchored portion is clamped between the supporting body and the clamping member.

14. The stereolithography apparatus of claim 13, wherein the clamping member comprises:
    a clamping body, wherein an end of the clamping body is connected to the supporting body; and
    a hook connected to another end of the clamping body and detachably hooked with an edge of the supporting body.

15. The stereolithography apparatus of claim 12, wherein the tank is further made from a flexible material with elasticity, and the supporting body is a transparent supporting plate.

16. The stereolithography apparatus of claim 2, further comprising a dynamometer disposed on the supporting body and connected to the transparent bottom plate.

17. The stereolithography apparatus of claim 2, wherein the tank further comprises:
    a transparent elastic layer disposed on the transparent bottom plate in the accommodating space; and
    a transparent low surface energy protective film disposed on the transparent elastic layer.

18. The stereolithography apparatus of claim 17, wherein the tank further comprises a transparent film with high resistance to impact and tearing, and the transparent film is disposed between the transparent elastic layer and the transparent low surface energy protective film.

19. The stereolithography apparatus of claim 17, wherein the material of the transparent elastic layer comprises silicone, polyurethane, or acrylic gel, and the material of the transparent low surface energy protective film comprises fluropolymer, polyethylene, or polypropylene.

20. The stereolithography apparatus of claim 2, wherein the tank further comprises a transparent material with low surface energy that is chemically resistant, impact resistantand elastic, and the transparent material is disposed on the transparent bottom plate in the accommodating space or is made into an accommodating tank.

* * * * *